Figure 1:
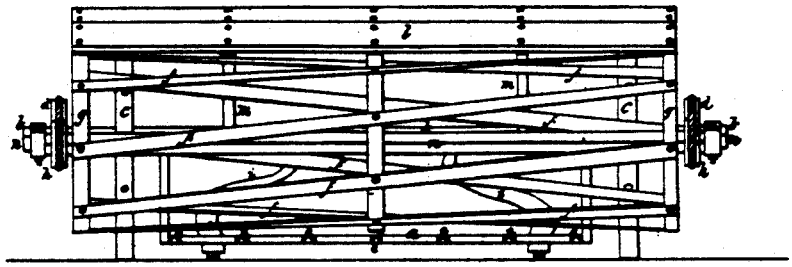
Figure 2:
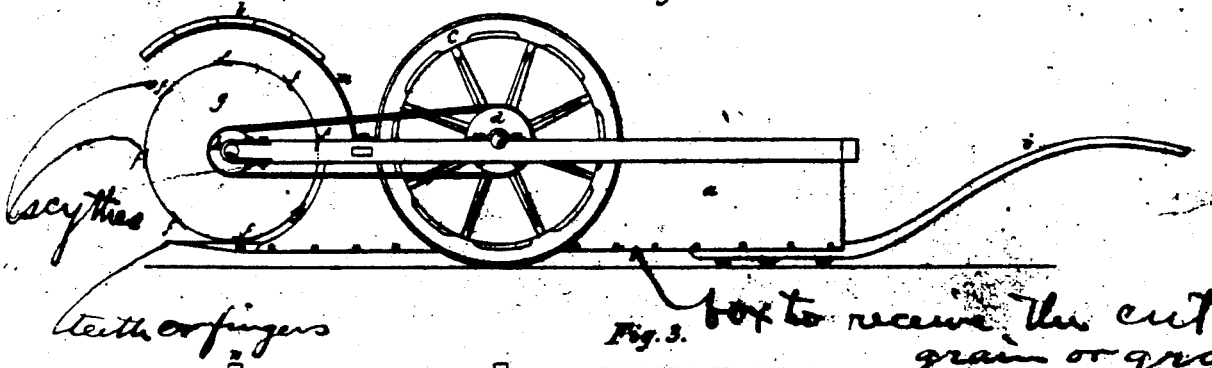
Figure 3:
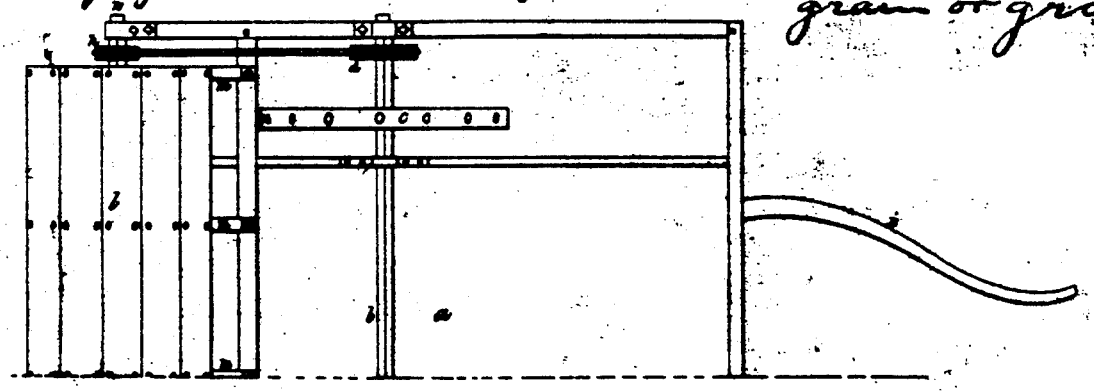
Figure 4:
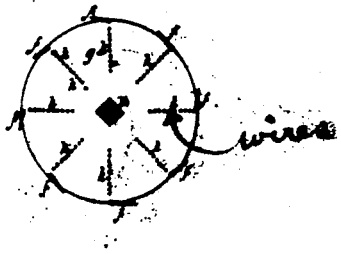

J. Ten Eyk.

Mower.

BEST AVAILABLE COPY

4242X

Patented Nov. 2, 1825

BEST AVAILABLE COPY

UNITED STATES PATENT OFFICE.

JAMES TEN EYK, OF BRIDGEWATER TOWNSHIP, SOMERSET COUNTY, N. J.

REAPING AND CUTTING MACHINE.

Specification forming part of Letters Patent dated November 2, 1825.

*To all whom it may concern:*

Be it known that I, JAMES TEN EYK, of Bridgewater township, Somerset county, State of New Jersey, have invented certain Improvements in Reaping and Cutting Machines, of which the following is a specification.

My machine is formed of a box of suitable dimensions, fastened on the axle-tree on which the carriage and two band-wheels run, and may extend back from the wheel, say, four feet. Previous to its being fastened it is best to balance the box on the axle-tree, lest it bear too hard either way on the arms of the person handling the machine. To the end of the bottom are three or five fingers or teeth nine inches long, so as to regulate the cut of the grain by the cutting scythe-wheel. This box may be made of any size, according to the fancy of the owner—say from two feet to twelve in the length of the scythes for a horse-machine; but it is recommended for the hand-machine not to be longer than four feet—the wheel for a man not more than seven feet, which may also answer if the ends of the axle project one foot. The scythes may be about one-eighth of an inch on the back and two inches in width, tapering to an edge. The scythes are fastened by each end to a board-wheel with screws, so that they may be taken off to be ground when necessary. A machine for horse-power is best with three wheels—one at each end and one in the middle—so that the scythes need not be longer than half the width between the wheels, and fastened on the middle wheel in the slope of a screw turning one-eighth part round the wheel, so that one or other of the scythes will be cutting all the time. Six or eight scythes (at the option of the owner) are not to be closer than ten inches or more than fourteen inches apart around the wheel—say a wheel eighty-inch circumference with eight scythes would be ten inches apart. There is a small wheel of six inches diameter at each end of the cylinder's axle-tree, in which a groove or channel is cut of about an inch wide and an inch deep for a band to run in, which goes round another wheel fastened to the wheels on which the machinery moves, which have corresponding grooves cut in them to receive the bands that run round the small six-inch wheels which put all the scythes in motion.

This machine, in order to answer different purposes, must have three sets of wheels, wheat and rye requiring the largest. Those for them should be four and a half feet diameter, those for oats and flax three feet, and those for buckwheat, grass, and clover, which is required to be cut short, two feet diameter. The difference between the size of the wheels may be remedied by lowering or raising the hind part of the machine by the handles fastened to the bottom and turning up with one or two slats, fastening the handles together to strengthen them.

Raw cowhide is best and most durable for the bands which turn the scythe cylinder or wheel. It is necessary to put the bands in water once or twice a day in order to keep them from slipping. A rope may be made to answer instead of a rawhide. In the inside of the wheel there are wires for grain running through the wheels, so as to throw the grain back in the box. The inside wire should be an inch and a half from the scythe, and the remainder of the wires, running back about six inches, should be about an eighth of an inch apart. The scythe wheel or cylinder has a cover to prevent the heads of grain, &c., from flying up. This cover is supported by a frame behind the scythe-wheel, so as not to obstruct the sight of the person directing the machine.

A machine for cutting grass has the lower part of the frame, which supports the scythe-wheel, rounding, like a sleigh-runner, and a piece of wood running across the frame to prevent the scythes from being injured by stones. The frame for grass has nothing on which to receive it after it has been cut.

What I claim as my invention is—

The combination of the different parts of this machine so as to produce one similar to that above described.

JAMES TEN EYK.

Witnesses:
GEO. HADFIELD,
S. A. ELLIOTT.